United States Patent
Kohlert et al.

(10) Patent No.: US 11,610,299 B2
(45) Date of Patent: Mar. 21, 2023

(54) METHOD AND SYSTEM FOR OPTICAL PRODUCT AUTHENTICATION

(71) Applicant: KLÖCKNER PENTAPLAST GMBH, Heiligenroth (DE)

(72) Inventors: Christian Kohlert, Oberahr (DE); Axel Müller, Grassau (DE); Tamara Chistykova, St. Petersburg (RU)

(73) Assignee: KLÖCKNER PENTAPLAST GMBH, Heiligenroth (DE)

( * ) Notice: Subject to any disclaimer, the term of this patent is extended or adjusted under 35 U.S.C. 154(b) by 0 days.

(21) Appl. No.: 17/046,825

(22) PCT Filed: Apr. 12, 2019

(86) PCT No.: PCT/EP2019/059466
§ 371 (c)(1),
(2) Date: Oct. 12, 2020

(87) PCT Pub. No.: WO2019/197628
PCT Pub. Date: Oct. 17, 2019

(65) Prior Publication Data
US 2021/0150690 A1    May 20, 2021

(30) Foreign Application Priority Data

Apr. 12, 2018  (DE) .................... 10 2018 108 741.1

(51) Int. Cl.
*G06T 7/00* (2017.01)
*G06V 20/80* (2022.01)
(Continued)

(52) U.S. Cl.
CPC ......... *G06T 7/001* (2013.01); *G01N 15/1463* (2013.01); *G06K 19/06037* (2013.01);
(Continued)

(58) Field of Classification Search
CPC .......... G06T 7/001; G06T 7/337; G06T 7/80; G01N 15/1463; G06K 19/06037;
(Continued)

(56) References Cited

U.S. PATENT DOCUMENTS

| 4,218,674 A | 8/1980 | Brosow et al. |
| 8,628,014 B1 * | 1/2014 | Hoffer, Jr. .......... G06K 7/10811 235/462.23 |

(Continued)

FOREIGN PATENT DOCUMENTS

| DE | 10304805 A1 | 8/2004 |
| DE | 602004007850 T2 | 5/2008 |
| DE | 102015219400 A1 | 4/2017 |

OTHER PUBLICATIONS

International Preliminary Report on Patentability, PCT/EP2019/059466, International Filing Date Apr. 12, 2019.
(Continued)

*Primary Examiner* — Molly Wilburn
(74) *Attorney, Agent, or Firm* — Goodwin Procter LLP

(57) ABSTRACT

The invention relates to a method and system for optical product authentication, in which a product is labeled with optically active particles, a reference image is recorded in a registration step and a recognition image of the optically active particles is recorded in a recognition step. The product is then authenticated by comparing image data or a coding derived from image data in the registration step versus the recognition step.

15 Claims, 1 Drawing Sheet

(51) Int. Cl.
*G06V 20/69* (2022.01)
*G06V 20/00* (2022.01)
*G06T 7/80* (2017.01)
*G06T 7/33* (2017.01)
*G01N 15/14* (2006.01)
*G06K 19/06* (2006.01)

(52) U.S. Cl.
CPC ............... *G06T 7/337* (2017.01); *G06T 7/80* (2017.01); *G06V 20/693* (2022.01); *G06V 20/80* (2022.01); *G06V 20/95* (2022.01)

(58) Field of Classification Search
CPC ...... G06V 20/693; G06V 20/80; G06V 20/95; H04L 9/3278
See application file for complete search history.

(56) References Cited

U.S. PATENT DOCUMENTS

| | | | |
|---|---|---|---|
| 8,950,684 B1* | 2/2015 | Scholes | G06K 19/0614 235/494 |
| 10,885,413 B1* | 1/2021 | Scholl | G06K 19/06037 |
| 2002/0113127 A1* | 8/2002 | Takeuchi | G06K 19/08 235/462.25 |
| 2006/0215931 A1* | 9/2006 | Shimomukai | H04N 1/32251 382/284 |
| 2007/0262154 A1* | 11/2007 | Zazzu | G06K 19/06009 235/487 |
| 2008/0191027 A1* | 8/2008 | Yang | G09F 3/00 977/932 |
| 2009/0080760 A1* | 3/2009 | Knysh | G07D 7/206 382/141 |
| 2011/0233284 A1* | 9/2011 | Howard | G06K 19/06037 235/494 |
| 2012/0138679 A1* | 6/2012 | Doyle | G06K 19/06037 235/494 |
| 2017/0132465 A1* | 5/2017 | Kutter | G06K 7/1417 |
| 2019/0265399 A1* | 8/2019 | Northrup | G11B 7/1362 |
| 2021/0172945 A1* | 6/2021 | Armbruster | G01N 21/8483 |
| 2022/0058355 A1* | 2/2022 | Yoshida | G06K 19/067 |

OTHER PUBLICATIONS

International Search Report, PCT/EP2019/059466, International Filing Date Apr. 12, 2019.

Smith et al., "Plasmonic Nanoparticles as a Physically Unclonable Function for Responsive Anti-Counterfeit Nanofingerprints", Advanced Functional Materials, Jan. 25, 2016, 26: 9, 7 pages.

Carro-Temboury et al., "An optical authentication system based on imaging of excitation-selected lanthanide luminescence", Science Advances, Jan. 1, 2018, 4:1, 7 pages.

* cited by examiner

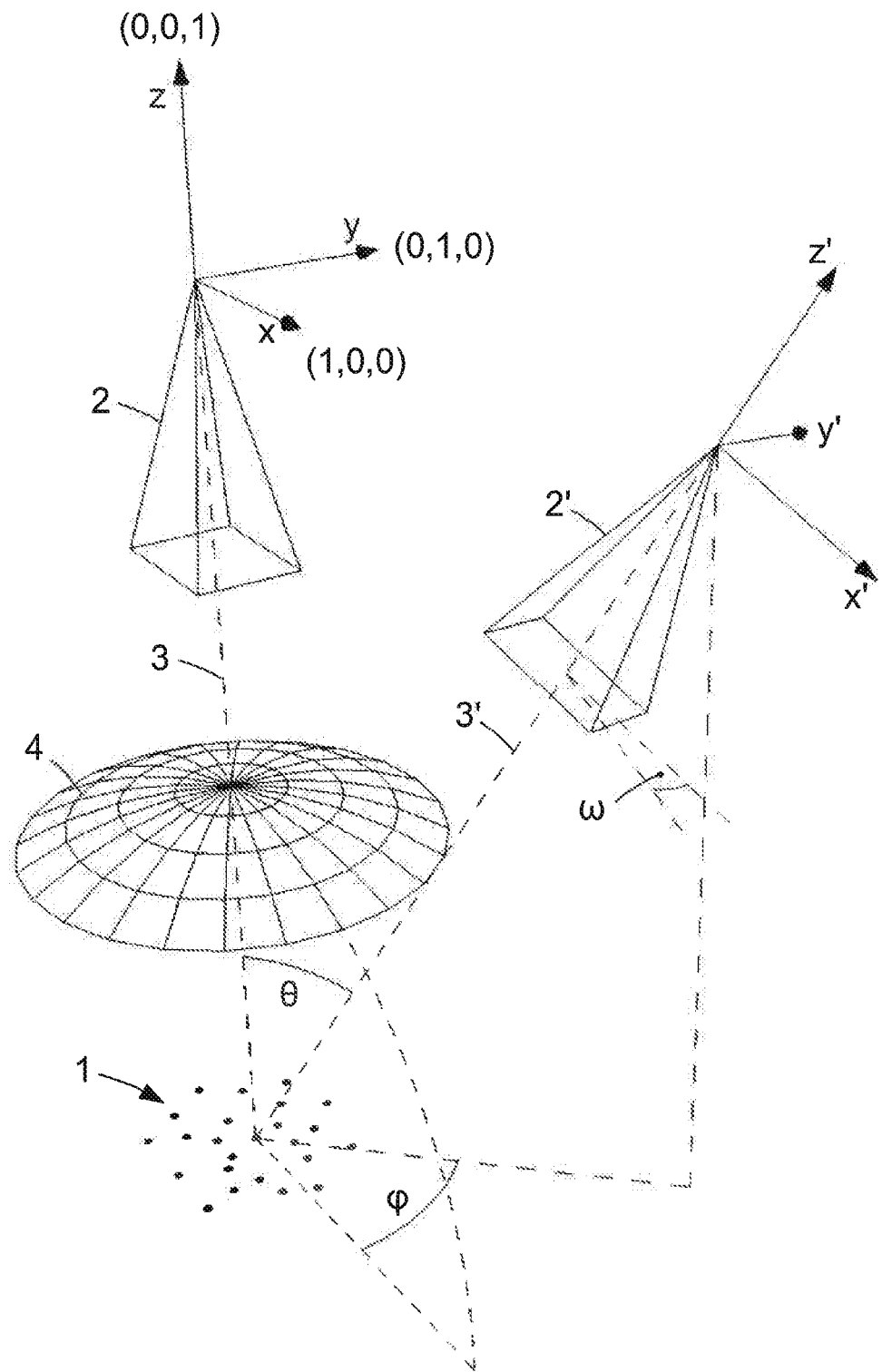

METHOD AND SYSTEM FOR OPTICAL PRODUCT AUTHENTICATION

CROSS-REFERENCE TO RELATED APPLICATIONS

This application is being filed under 35 U.S.C. § 371 as a National Stage Application of pending International Application No. PCT/EP2019/059466 filed Apr. 12, 2019, which claims priority to the following parent application: German Patent Application No. 10 2018 108 741.1, filed Apr. 12, 2018. Both International Application No. PCT/EP2019/059466 and German Patent Application No. 10 2018 108 741.1 are hereby incorporated by reference herein in their entirety.

FIELD OF THE INVENTION

The present invention relates to a method for optical product authentication, including:
a) steps for marking a product by
packaging the product in a film; or
equipping the product or a packaging of the product with a label; or
equipping the product, a packaging of the product or a label arranged on the product or on the packaging with a lacquer coating; wherein
the film, the label or the lacquer coating contains randomly distributed, reflecting and/or luminescent particles;
b) steps for registering a product marked as per a) by
irradiating the product with light such that the particles reflect or luminesce;
recording one or more digital reference images of the reflecting and/or luminescent particles using a camera; and
c) steps for authenticating a product registered as per b) by
irradiating the product with light such that the particles reflect or luminesce;
recording one or more recognition images of the reflecting and/or luminescent particles using a camera;
digitally comparing the at least one recognition image with the at least one reference image;
displaying a positive authentication if the at least one recognition image and the at least one reference image correspond to a sufficient extent; or
displaying a negative authentication if the at least one recognition image and the at least one reference image differ to a sufficient extent.

Moreover, the invention relates to a system for the optical authentication of products, comprising:
(i) marks, each embodied as a film, film region, label or lacquer coating and containing randomly distributed, reflecting and/or luminescent particles;
(ii) a registration system comprising a primary image capture system for recording one or more reference images of a product equipped with a mark, and a primary image processing system;
(iii) a database;
(iv) a communication system on the basis of the Internet and/or a mobile wireless network; and
(v) one or more authentication systems, each equipped with a secondary image capture system for recording one or more recognition images of a product equipped with a mark.

BACKGROUND OF THE INVENTION

Methods for authenticating objects, such as documents or banknotes, are known from the prior art.

U.S. Pat. No. 4,218,674 discloses a system and a process for checking the authenticity of a document, wherein binary output signals generated on the basis of the document are compared to binary signals stored in advance. The document contains a security marker in the form of randomly distributed fibers made of a magnetic or magnetizable material. To read the security marker, the document is scanned along a predetermined track using a detector which registers magnetic fields and which outputs an electrical pulse when crossing the magnetic or magnetized fibers.

DE 103 04 805 A1 describes a method for producing security markers, in which use is made of a random pattern present on, or applied to, an object to be marked. To this end, the random pattern is read into a computer using a reader and a fingerprint containing individual features of the pattern is extracted. Optionally, an identification number is applied to the object. The extracted fingerprint is stored in a machine data memory. To identify the marked objects, the random pattern is read from the object, the fingerprint is extracted and compared with the fingerprint stored in the data memory.

DE 60 2004 007 850 T2 discloses a method, a computer program and an electronic apparatus for determining the authenticity of an object, the object having a three-dimensional pattern of randomly distributed particles. The method works with a first and a second code. The second code is ascertained by two-dimensional data capture on the pattern of randomly distributed particles. To this end, the object is illuminated with white scattered light and the light reflected and transmitted by the object is detected. The object, which comprises a pattern of randomly distributed particles, is preferably a label.

The security markers known from the prior art can be assigned to two groups A) and B):

A) The security marker is an inherent component part of the product, which randomly arises during the production or which is generated by targeted measures. Here, the type and nature of the security marker is tightly constrained on account of the material composition, surface structure, and form of the product. Known product-inherent security markers include, inter alia, optically detectable random surface patterns formed by scratches or fibers and precisely defined isotope admixtures in polymeric materials. Product-inherent security markers have a tightly constrained field of use and are unsuitable for foodstuffs, medicaments, cosmetics, and apparel textiles.

B) The security marker is designed as a label and attached to the product. Labels are disadvantageous in that their area is limited and they make it easy to localize and identify the safety mark. Using modern, commercially available instruments from metrology and analysis, it is possible, as a rule, to quickly ascertain the physical-chemical nature and the functional principle of the security marker. Once the nature and functional principle are known, copy protection, at best, stands in the way of replication. The prior art describes two processes for forming copy protection, with the two processes also being combined. Proposed are, firstly, an "invisible" security marker and, secondly, a non-reproducible security marker or a security marker that is only reproducible with disproportionately great effort.

The following aspects play an important role in respect of the copy protection of security markers:
I) Reproducibility
Where possible, a security marker should not be reproducible. Here, the term "reproducible" should not be understood within the meaning of an exact physical replication but in relation to the capture, by measurement, of certain patterns present in the security marker. In known security markers, use is usually made of spatial—as a rule, two-dimensional—patterns such as, e.g., smart codes, which are captured by means of optical or magnetic detectors. Holograms, in particular, should be specified as an example of a three-dimensional pattern. Security markers containing chemical markers such as, e.g., isotopes, which are detected by means of spectroscopic measurement processes, are less common.

To reproduce a security marker, the pattern must first be identified. The identification of a pattern can be made difficult in various ways, inter alia by using a pattern that is not visible to the human eye. Thus, the prior art proposes covert patterns. However, most of the known invisible patterns can be identified with little effort using measurement processes currently available.

After identification, it is necessary to re-create or reproduce the pattern in such a way that the reproduction cannot be distinguished from the original during metrological capture. In principle, any identified pattern can be reproduced, although the effort required to this end is of crucial importance. If the effort of the reproduction exceeds the resulting economic advantage, the reproduction is not worthwhile and is not done. The effort of the reproduction is closely related to the metrological capture of the pattern. In general, the simpler the metrological capture, the less effort the reproduction requires.

Moreover, the information content of safety markers is important. Here, the term information content should be understood as a synonym for the number of structural details, such as points or lines. The higher the information content, the more effort the replication requires. The information content has an upper limit given by the area ratio of the security marker to the size of the detail structures. The larger the area of the security marker and the smaller the detail structures, the greater the maximum possible information content.

II) Metrological Capture

As a rule, the metrological capture of security markers is implemented at two or more locations and/or points in time, for example at the manufacturer of a product, possibly in a freight warehouse or during transport, and at a dealer or a consumer. Here, a product is initially equipped with a security marker during a marking step. As a rule, the security marker or the pattern contained therein is not known a priori; instead, it is captured by metrology and the measurement signal is recorded in encrypted or unencrypted form as an identity code. In a subsequent identification step, a security marker situated on a product is captured by metrology like in the marking step and the measurement signal in encrypted or unencrypted form is compared with available identity codes.

During the metrological capture, the product provided with a security marker is positioned under a detector or guided past a detector. The latter is the case, for example, with laser scanners, magnetic read heads or cameras with line sensors, as are common in industrial image processing. The positioning or movement of the product relative to the detector is implemented manually or by means of a mechanical apparatus such as a conveyor belt. Here, certain requirements must be observed due to product-technical or logistical conditions. It is often necessary or desirable for the metrological capture to be implemented in contactless fashion, the working distance between the product and a detector not being allowed to drop below a minimum distance of a few cm to a few meters. If the working distance should be more than a few cm, optical methods, in particular imaging methods, are preferably used for the metrological capture. Here, important measurement parameters such as resolution, image field and working distance cannot be set arbitrarily, but influence each other in accordance with the laws of optics. Additionally, albeit to a lesser extent, the choice of measurement parameters is restricted by the camera lens used. In contrast to high-performance lenses for astronomical or satellite technology applications, the camera lenses designed for industrial needs cannot fully exploit the possibilities of optical metrology.

The metrological capture of security markers must meet various, in part contradictory requirements; these include:

high sensitivity, so that slight deviations of a copied security marker from the original are recognized. In the case of the optical detection of two-dimensional patterns, sensitivity primarily means a high lateral resolution and contrast; i.e., the optical measuring system used must have an optimized modulation transfer function.

immunity to metrological deviations, so that the false-negative error rate, i.e., the number of original security markers incorrectly evaluated as a forgery, is low. Frequent metrological deviations during the optical capture include incorrect positioning of the security marker relative to the detector, vibrations and different lighting conditions.

low costs for the acquisition and operation of the measuring system.

high speed or high throughput.

automation.

III) Coding

The term coding encompasses all known electronic and mathematical methods that are used in the metrological capture, conversion, encryption, storage, and reproduction of security markers. These methods can be implemented in the form of electronic hardware or software. The data volume used in the coding is substantially determined by the information content of the security marker in connection with the resolving power of the metrological capture. In the optical capture of two-dimensional patterns, the data volume has an upper limit given by the product of the number of pixels resolved by metrology (resolution pixels) and the number of color or contrast levels per resolution pixel. Detail structures of the security marker that are smaller than the resolution pixel cannot be detected and therefore cannot be coded.

In accordance with the aforementioned boundary conditions, the methods known in the prior art have a number of disadvantages, such as a high error rate or reduced security;

the use of special cameras or measuring devices during authentication;

the observation of tightly constrained measurement conditions, such as a specified camera perspective during authentication;

cumbersome handling; and the need for a modification or adaptation of the product or a product packaging, in particular of the visual appearance.

SUMMARY OF ADVANTAGEOUS EMBODIMENTS OF THE INVENTION

The object of the present invention is to overcome the aforementioned disadvantages and provide a simple and robust method for optical product authentication.

This object is achieved by a method comprising a) steps for marking a product by packaging the product in a film; or equipping the product or a packaging of the product with a label; or equipping the product, a packaging of the product or a label arranged on the product or on the packaging with a lacquer coating; wherein the film, the label or the lacquer coating contains randomly distributed, reflecting and/or luminescent particles;

b) steps for registering a product marked as per a) by irradiating the product with light such that the particles reflect or luminesce;

recording one or more digital reference images of the reflecting and/or luminescent particles using a camera; and c) steps for authenticating a product registered as per b) by irradiating the product with light such that the particles reflect or luminesce;

recording one or more recognition images of the reflecting and/or luminescent particles using a camera;

digitally comparing the at least one recognition image with the at least one reference image;

displaying a positive authentication if the at least one recognition image and the at least one reference image correspond to a sufficient extent; or displaying a negative authentication if the at least one recognition image and the at least one reference image differ to a sufficient extent; wherein imaging-related deviations between the at least one recognition image and the at least one reference image are digitally compensated.

BRIEF DESCRIPTION OF THE FIGURE

FIG. 1 schematically illustrates and exemplary inventive system for the optical authentication of products.

DETAILED DESCRIPTION OF ADVANTAGEOUS EMBODIMENTS OF THE INVENTION

Advantageous embodiments of the method are characterized in that the density of the particles in the film, the label or the lacquer is 30 to 20 000 particles/cm$^3$;

the density of the particles in the film, the label or the lacquer is 30 to 10 000 particles/cm$^3$ or 30 to 5000 particles/cm$^3$;

the surface density of the particles in the film, the label or the lacquer is 1 to 100 particles/cm$^2$;

the surface density of the particles in the film, the label or the lacquer is 1 to 20 particles/cm$^2$, 10 to 30 particles/cm$^2$, 20 to 40 particles/cm$^2$, 30 to 50 particles/cm$^2$, 40 to 60 particles/cm$^2$, 50 to 70 particles/cm$^2$, 60 to 80 particles/cm$^2$, 70 to 90 particles/cm$^2$ or 80 to 100 particles/cm$^3$;

the product or the label is equipped with a transparent cover film containing reflecting and/or luminescent particles;

the product or the label has a multi-layer construction and one layer consists of a film containing reflecting and/or luminescent particles;

the particles consist of titanium dioxide and have a spherical form with an equivalent diameter in the range of 10 to 200 µm;

the particles consist of titanium dioxide and have a spherical form with an equivalent diameter in the range of 10 to 40 µm, 20 to 50 µm, 30 to 60 µm, 40 to 70 µm, 50 to 80 µm, 60 to 90 µm, 70 to 100 µm, 80 to 110 µm, 90 to 120 µm, 100 to 130 µm, 110 to 140 µm, 120 to 150 µm, 130 to 160 µm, 140 to 170 µm, 150 to 180 µm, 160 to 190 µm or 170 to 200 µm;

the particles consist of glass;

the particles consist of glass with an optical refractive index of 1.5 to 2.0;

the particles consist of glass with an optical refractive index of 1.5 to 1.7, 1.6 to 1.8, 1.7 to 1.9 or 1.8 to 2.0;

the particles consist of glass with an optical refractive index of 1.85 to 1.95;

the particles consist of glass and have a spherical form with an equivalent diameter in the range of 10 to 200 µm;

the particles consist of glass and have a spherical form with an equivalent diameter in the range of 10 to 40 µm, 20 to 50 µm, 30 to 60 µm, 40 to 70 µm, 50 to 80 µm, 60 to 90 µm, 70 to 100 µm, 80 to 110 µm, 90 to 120 µm, 100 to 130 µm, 110 to 140 µm, 120 to 150 µm, 130 to 160 µm, 140 to 170 µm, 150 to 180 µm, 160 to 190 µm or 170 to 200 µm;

each particle consists of a spherical substrate made of glass with an equivalent diameter in the range of 20 to 200 µm and spherical coating particles, arranged on the substrate, made of amorphous glass or a ceramic material such as titanium dioxide, for example, with an equivalent diameter of 0.5 to 10 µm;

the coating particles made of amorphous glass or a ceramic material such as titanium dioxide, for example, are frictionally connected to the surface of the spherical substrate made of glass;

the coating particles made of amorphous glass or a ceramic material such as titanium dioxide, for example, have an optical refractive index of 2.2 to 2.7;

the particles consist of an interference pigment;

the particles consist of interference pigment which comprises a substrate material such as mica, silicate, aluminum oxide, calcium aluminum borosilicate or aluminum, the substrate material being equipped with an interference coating made of a material such as titanium dioxide, iron oxide, chromium oxide, zirconium oxide or silicon dioxide;

the particles consist of a fluorescent material to an extent of 20 to 100 wt %, said material fluorescing upon irradiation with light in the wavelength range from 430 to 490 nm, 30 to 100% of the intensity of the fluorescent light having a wavelength in the range of 650 to 800 nm;

the particles consist of a fluorescent material to an extent of 20 to 100 wt %, said material fluorescing upon irradiation with light in the wavelength range from 430 to 490 nm, 40 to 100%, 50 to 100%, 60 to 100%, 70 to 100% or 80 to 100% of the intensity of the fluorescent light having a wavelength in the range of 650 to 800 nm;

the particles consist of a fluorescent material which comprises europium-doped calcium aluminum silicon nitride ($CaAlSiN_3:Eu^{2+}$);

the particles consist of a fluorescent material which comprises europium-doped calcium aluminum silicon nitride ($CaAlSiN_3:Eu^{2+}$) and a glass, such as $ZnO$—$B_2O_3$—$BaO$—$Al_2O_3$ glass;

the particles consist of a luminescent material to an extent of 50 to 100 wt %, said material luminescing following irradiation with light in the wavelength range from 430 to 490 nm, 60 to 100% of the intensity of the luminescent light a wavelength in the range of 450 to 1000 nm;

the particles consist of a luminescent material to an extent of 50 to 100 wt %, said material luminescing following irradiation with light in the wavelength range from 430 to 490 nm and 60 to 100% of the intensity of the luminescent light has a wavelength in the range of 450 to 650 nm;

the particles consist of a luminescent material to an extent of 50 to 100 wt %, said material luminescing following irradiation with light in the wavelength range from 430 to 490 nm and 80 to 100% of the intensity of the luminescent light has a wavelength in the range of 450 to 650 nm;

the particles consist of a luminescent material to an extent of 50 to 100 wt %, said material luminescing following irradiation with light in the wavelength range from 430 to 490 nm and having a luminance of ≥400 mcd/m$^2$, measured pursuant to DIN 67510-1:2009, after 1 min;

the particles consist of a luminescent material to an extent of 50 to 100 wt %, said material luminescing following irradiation with light in the wavelength range from 430 to 490 nm and having a luminance of ≥600 mcd/m$^2$, ≥800 mcd/m$^2$, ≥1000 mcd/m$^2$, ≥1500 mcd/m$^2$, ≥2000 mcd/m$^2$, ≥4000 mcd/m$^2$, ≥6000 mcd/m$^2$, ≥8000 mcd/m$^2$, ≥10 000 mcd/m$^2$, ≥20 000 mcd/m$^2$, ≥30 000 mcd/m$^2$ or ≥40 000 mcd/m$^2$, measured pursuant to DIN 67510-1:2009, after 1 min;

the particles consist of a material to an extent of 50 to 100 wt %, said material having a luminescence lifetime τ with 1 ms≤τ≤10 h;

the particles consist of a material to an extent of 50 to 100 wt %, said material having a luminescence lifetime τ with 10 ms≤τ≤10 h, 100 ms≤τ≤10 h, 1 s≤τ≤10 h, 10 s≤τ≤10 h or 60 s≤τ≤10 h;

the particles consist to an extent of 50 to 100 wt % of a material based on yttrium aluminum garnet ($Y_3Al_5O_{12}$; YAG), yttrium aluminum gallium garnet ($Y_3Al_{5-x}Ga_xO_{12}$ with 2.5≤x≤3.5; YAGG), strontium aluminate ($SrAl_2O_4$, $Sr_4Al_{14}O_{25}$), calcium aluminate ($CaAl_2O_4$), strontium thiogallate ($SrGa_2S_4$) or potassium titanium fluoride ($K_2TiF_6$);

the particles consist to an extent of 50 to 100 wt % of Ce- and/or Cr-doped yttrium aluminum garnet ($Y_3Al_5O_{12}$; YAG) or yttrium aluminum gallium garnet ($Y_3Al_{5-x}Ga_xO_{12}$ with 2.5 5×5 3.5; YAGG);

the particles consist to an extent of 50 to 100 wt % of Eu- and Dy-doped strontium aluminate ($SrAl_2O_4$, $Sr_4Al_{14}O_{25}$);

the particles consist to an extent of 50 to 100 wt % of Eu-, Nd- and/or Sr-doped calcium aluminate ($CaAl_2O_4$);

the particles consist to an extent of 50 to 100 wt % of Eu-doped strontium thiogallate ($SrGa_2S_4$);

the particles consist to an extent of 50 to 100 wt % of Mn-doped potassium titanium fluoride ($K_2TiF_6$);

the reflecting and/or luminescent particles comprise two, three, four, five or more different types, each particle consisting to an extent of 20 to 100 wt % of one of the above-described materials;

the reflecting and/or luminescent particles comprise two, three, four, five or more different types, each particle having one of the above-described structures;

the particles have an average size $d_{50}$ with 5 μm≤$d_{50}$≤200 μm;

the particles have an average size $d_{50}$ with 10 μm≤$d_{50}$≤150 μm, 20 μm≤$d_{50}$≤150 μm, 30 μm≤$d_{50}$≤150 μm, 40 μm≤$d_{50}$≤150 μm, 50 μm $d_{50}$≤150 μm or 30 μm $d_{50}$≤100 μm;

the product or a packaging of the product is equipped with a serial number or a digital code, such as a barcode or QR code;

the product or a packaging of the product is equipped with a label with a serial number or a digital code, such as a barcode or QR code;

the product or a packaging of the product is equipped with one or more orientation marks;

the product or a packaging of the product is equipped with a label comprising one or more orientation marks;

within the scope of the registration b)

two, three, four, five, six, seven, eight, nine, ten or more reference images of the reflecting and/or luminescent particles are recorded from defined, differing camera perspectives;

11 to 30, 20 to 40, 30 to 50, 40 to 60, 50 to 70, 60 to 80 or 70 to 100 reference images of the reflecting and/or luminescent particles are recorded from defined, differing camera perspectives;

101 to 300, 200 to 400, 300 to 500, 400 to 600, 500 to 700, 600 to 800 or 700 to 1000 reference images of the reflecting and/or luminescent particles are recorded from defined, differing camera perspectives;

a plurality of reference images of the reflecting and/or luminescent particles are recorded from defined, differing camera perspectives, the product being arranged on a rotary table and the rotary table with the product being respectively rotated by a predetermined azimuthal difference angle between the recording of two successive reference images;

a plurality of reference images of the reflecting and/or luminescent particles are recorded from defined, differing camera perspectives, the camera being respectively tilted by a predetermined polar difference angle between the recording of two successive reference images;

a plurality of reference images of the reflecting and/or luminescent particles are recorded from defined, differing camera perspectives, the camera being respectively tilted by a predetermined polar difference angle between the recording of two successive reference images in such a way that a polar tilt angle between the optical axis of the camera and the gravitational axis assumes a predetermined value;

the shape of the product is captured using a 3D scanner and the ascertained three-dimensional shape coordinates are used for digital calibration of the one or more reference images;

one or more visual features of the product, such as contours, edges, inscriptions, barcodes, QR codes or label edges, in the at least one reference image are imaged simultaneously with the reflecting and/or luminescent particles;

one or more orientation marks in the at least one reference image are imaged simultaneously with the reflecting and/or luminescent particles;

the one or more reference images of the reflecting and/or luminescent particles are stored in a database;

a reference key is calculated in each case on the basis of the one or more reference images of the reflecting and/or luminescent particles;

image coordinates of the reflecting and/or luminescent particles are determined in each of the one or more reference images on the basis of the intensity of the reflected light or on the basis of the intensity of the luminescent light;

image coordinates of the reflecting and/or luminescent particles are determined in each of the one or more reference images by means of threshold separation;

image coordinates of the reflecting and/or luminescent particles are determined in each of the one or more reference images by means of grayscale value threshold separation;

the one or more reference images are each converted into a grayscale value image file and binarized by means of grayscale value threshold separation;

image coordinates of the reflecting and/or luminescent particles are determined in each of the one or more reference images with the aid of a recursive grass fire algorithm;

image coordinates of the reflecting and/or luminescent particles are determined in each of the one or more reference images with the aid of a sequential grass fire algorithm;

the reference key comprises the image coordinates of the reflecting and/or luminescent particles in the respective reference image;

the reference key is compiled from the image coordinates of the reflecting and/or luminescent particles in the respective reference image;

the reference key comprises angles of polygons formed from the image coordinates of the reflecting and/or luminescent particles in the respective reference image;

the reference key comprises angles of triangles formed from the image coordinates of the reflecting and/or luminescent particles in the respective reference image;

the one or more reference keys are stored in a database;

the serial number or the digital code is stored in a database;

the one or more reference keys and the serial number or the digital code are linked in the database;

the one or more reference keys and the serial number or the digital code are linked in the database by means of a database relation;

the product is supported by a horizontal surface when recording the one or more reference images;

the product is arranged on a horizontal surface when recording the one or more reference images;

the one or more reference images are recorded by a camera equipped with a CCD image sensor;

the one or more reference images are recorded by a camera equipped with a CMOS image sensor;

the one or more reference images are recorded by a camera equipped with a BSI image sensor;

when recording the one or more reference images, the camera is aligned in such a way that an angle between the optical axis of the camera and the gravitational axis is ≤5 degrees;

when recording the one or more reference images, the camera is aligned in such a way that an angle between the optical axis of the camera and the gravitational axis is ≤2 degrees;

when recording the one or more reference images, the camera is aligned in such a way that an angle between the optical axis of the camera and the gravitational axis is ≤1 degree; within the scope of the authentication c)

the product is irradiated by light, 10 to 100% of the intensity thereof having a wavelength in the range of 430 to 490 nm;

the product is irradiated by light, 10 to 90%, 20 to 80%, 30 to 70% or 40 to 60% of the intensity thereof having a wavelength in the range of 430 to 490 nm;

the product is irradiated by the light from a GaN LED or an InGaN LED;

the product is irradiated by the light from a white light GaN LED or a white light InGaN LED;

ambient light is blocked during the recording of the one or more recognition images;

ambient light is blocked with the aid of a stop during the recording of the one or more recognition images;

ambient light is blocked with the aid of a tubular stop during the recording of the one or more recognition images;

the one or more recognition images are recorded by a camera equipped with a CCD sensor;

the one or more recognition images are recorded by a camera equipped with a CMOS sensor;

the one or more recognition images are recorded by a camera equipped with a BSI sensor;

the one or more recognition images are recorded by a camera equipped with a color CCD sensor;

the one or more recognition images are recorded by a camera equipped with a color CMOS sensor;

the one or more recognition images are recorded by a camera equipped with a color BSI sensor;

the one or more recognition images are recorded by a cellular telephone equipped with a digital camera;

the one or more recognition images are recorded by a cellular telephone, which is equipped with a digital camera and a GaN LED or InGaN LED;

the one or more recognition images are recorded by a cellular telephone, which is equipped with a digital camera and a white light GaN LED or white light InGaN LED;

the product is supported by a horizontal surface when recording the one or more recognition images;

the product is arranged on a horizontal surface when recording the one or more recognition images;

when recording the one or more recognition images, the camera is aligned in such a way that an angle between the optical axis of the camera and the gravitational axis is ≤5 degrees;

when recording the one or more recognition images, the camera is aligned in such a way that an angle between the optical axis of the camera and the gravitational axis is ≤2 degrees;

when recording the one or more recognition images, the camera is aligned in such a way that an angle between the optical axis of the camera and the gravitational axis is ≤1 degree;

the one or more recognition images are recorded by a cellular telephone, which is equipped with a tilt sensor;

an angle $\theta$ between the optical axis of the camera of the cellular telephone and the gravitational axis is measured using the tilt sensor at the same time as the one or more recognition images are recorded;

the one or more recognition images are recorded by a cellular telephone, which is equipped with a 3-axis acceleration sensor;

an angle $\theta$ between the optical axis of the camera of the cellular telephone and the gravitational axis is measured using the 3-axis acceleration sensor at the same time as the one or more recognition images are recorded;

one, two, three, four, five, six, seven, eight, nine, ten or more recognition images are recorded;

two, three, four, five, six, seven, eight, nine, ten or more recognition images are recorded from the same camera perspective;

two, three, four, five, six, seven, eight, nine, ten or more recognition images are recorded from differing camera perspectives;

two, three, four, five, six, seven, eight, nine, ten or more recognition images are recorded, the product being irradiated with light in the time period between the recording of two recognition images;

two, three, four, five, six, seven, eight, nine, ten or more recognition images are recorded, the product being irradiated with light from a GaN LED, InGaN LED, white light GaN LED or white light InGaN LED in the time period between the recording of two recognition images;

the one or more recognition images are digitally intensified;

the one or more recognition images are digitally intensified with the aid of digital image processing in order to increase the signal-to-noise ratio;

two, three, four, five, six, seven, eight, nine, ten or more recognition images are digitally overlaid or added;

a combination image is calculated digitally on the basis of two, three, four, five, six, seven, eight, nine, ten or more recognition images;

a serial number arranged on the product, a packaging film or a label is imaged simultaneously with the reflecting and/or luminescent particles;

the image of the serial number is digitized using character recognition;

the serial number is compared with serial numbers stored in a database;

a digital code, such as a barcode or QR code, arranged on the product, a packaging film or a label is imaged simultaneously with the reflecting and/or luminescent particles;

the digital code is decoded;

the digital code is compared with digital codes stored in a database;

one or more visual features of the product, such as contours, edges, inscriptions, barcodes, QR codes or label edges, in the at least one recognition image are imaged simultaneously with the reflecting and/or luminescent particles;

a digital image registration between the at least one recognition image and the one or more reference images is performed on the basis of the one or more visual features of the product, such as contours, edges, inscriptions, barcodes, QR codes or label edges;

one or more orientation marks in the at least one or more recognition images are imaged simultaneously with the reflecting and/or luminescent particles;

a digital image registration between the at least one recognition image and the one or more reference images is performed on the basis of the one or more orientation marks;

the at least one recognition image and the one or more reference images are compared digitally;

a digital image registration between the combination image and the one or more reference images is performed on the basis of the one or more orientation marks;

the combination image and the one or more reference images are compared digitally;

an angle θ between the optical axis of the camera of the cellular telephone and the gravitational axis, measured by means of the tilt sensor, is used in the digital comparison of the at least one recognition image or the combination image with the one or more reference images;

an angle θ between the optical axis of the camera of the cellular telephone and the gravitational axis, measured by means of the 3-axis acceleration sensor, is used in the digital comparison of the at least one recognition image or the combination image with the one or more reference images;

image coordinates of the reflecting and/or luminescent particles are determined in each of the one or more recognition images on the basis of the intensity of the reflected light or on the basis of the intensity of the luminescent light;

image coordinates of the reflecting and/or luminescent particles are determined in each of the one or more recognition images by means of threshold separation;

image coordinates of the reflecting and/or luminescent particles are determined in each of the one or more recognition images by means of grayscale value threshold separation;

the one or more recognition images are each converted into a grayscale value image file and binarized by means of grayscale value threshold separation;

image coordinates of the reflecting and/or luminescent particles are determined in each of the one or more recognition images with the aid of a recursive grass fire algorithm;

image coordinates of the reflecting and/or luminescent particles are determined in each of the one or more recognition images with the aid of a sequential grass fire algorithm;

a recognition key is calculated on the basis of the at least one recognition image;

a recognition key is calculated on the basis of the combination image;

an angle θ between the optical axis of the camera of the cellular telephone and the gravitational axis, measured by means of the tilt sensor, is used in the calculation of the recognition key;

an angle θ between the optical axis of the camera of the cellular telephone and the gravitational axis, measured by means of the 3-axis acceleration sensor, is used in the calculation of the recognition key;

the recognition key comprises the image coordinates of the reflecting and/or luminescent particles in the respective recognition image;

the recognition key is compiled from the image coordinates of the reflecting and/or luminescent particles in the respective recognition image;

the recognition key comprises angles of polygons formed from the image coordinates of the reflecting and/or luminescent particles in the respective recognition image;

the recognition key comprises angles of triangles formed from the image coordinates of the reflecting and/or luminescent particles in the respective recognition image;

the recognition key comprises the image coordinates of the reflecting and/or luminescent particles in the combination image;

the recognition key is compiled from the image coordinates of the reflecting and/or luminescent particles in the combination image;

the recognition key comprises angles of polygons formed from the image coordinates of the reflecting and/or luminescent particles in the combination image;

the recognition key comprises angles of triangles formed from the image coordinates of the reflecting and/or luminescent particles in the combination image;

the recognition key is compared with a reference key stored in a database;

the recognition key is compared with a plurality of reference keys stored in a database;

a positive authentication is displayed if the recognition key and a reference key stored in a database correspond to a sufficient extent; and/or a negative authentication is displayed if the recognition key and a reference key stored in a database deviate from one another to a sufficient extent.

A preferred embodiment of the method according to the invention comprises digital processes for intensifying the one or more recognition images of the reflecting and/or luminescent particles. The digital intensification is implemented as per one of the processes described below or as per a combination of two or more of these processes:

adding or overlaying two or more recognition images recorded from the same camera perspective;

combining 4 (2×2) or 16 (4×4) adjacent image pixels to form one pixel, where necessary by means of numerical interpolation;

performing a differential analysis of two or more recognition images recorded in sequence in order to detect changes in the pixel intensities over time;

performing color filtering, in particular a restriction to the green component and/or the red component of the one or more recognition images;

subtracting color components or color channels, in particular performing a weighted subtraction of the blue component or the blue color channel from the green and/or red color component or color channel;

In the context of the present invention, the terms "luminescence" and "luminescent" denote substances and particles which fluoresce or phosphoresce as a result of excitation with electromagnetic radiation (de.wikipedia.org/wiki/Lumineszenz) Accordingly, according to the invention, fluorescence and phosphorescence (de.wikipedia.org/wiki/Phosphoreszenz) are subsumed under the term luminescence.

In the context of the present application, the term "reflective" denotes simply reflective, retroreflective (de.wikipedia.org/wiki/Retroreflektor) and iridescent (de.wikipedia.org/wiki/Irisieren) particles or pigments which reflect electromagentic radiation, in particular light with wavelenghts in the range of 380 to 780 nm, on account of diffraction or interference. Here, the term "retroreflective" refers to particles or pigments that reflect a significant part of the incident intensity substantially counter to the direction of incidence. Spherical particles made of glass or titanium dioxide with an equivalent diameter in the range of 10 to 200 µm, in particular, are used as retroreflective particles. The spherical particles preferably consist of a glass with an optical refractive index in the range of 1.5 to 2.0. The optical refractive index of titanium dioxide is approximately 2.6. Customary polymers have an optical refractive index of approximately 1.4. The greater the difference between the optical refractive indices of the retroreflective particles and a surrounding polymer matrix, the higher the luminous intensity reflected by the particles.

According to the invention, the term "iridescent" (de.wikipedia.org/wiki/Irisieren) includes particles or pigments which simply reflect or retroreflect colored light with wavelengths from a narrow range of the visible spectrum from 380 to 780 nm. Iridescent particles or pigments usually consist of a substrate material such as mica, silicate, aluminum oxide, calcium aluminum borosilicate or aluminum, which substrate material is equipped with an interference coating made of a material such as titanium dioxide, iron oxide, chromium oxide, zirconium oxide or silicon dioxide. The interference coating has a precisely defined thickness d such that, for a given wavelength $\lambda$, the optical path difference or the optical path length, i.e., the product of the thickness d and the optical refractive index n ($\lambda$), corresponds to an odd multiple of half the wavelength according to the relationship $$d \cdot n(\lambda) = \frac{2k+1}{2} \cdot \lambda$$

with $k \in \mathbb{Z}$, in particular k=0 (de.wikipedia.org/wiki/Optische_Weglange; de.wikipedia.org/wiki/Gangunterschied).

According to the invention, the term "azimuthal angle" (de.wikipedia.org/wiki/Kugelkoordinaten) denotes the angle of a rotation about a spatial axis parallel to gravity, i.e., about a vertical spatial axis.

According to the invention, the term "polar angle" (de.wikipedia.org/wiki/Kugelkoordinaten) denotes a tilt angle that is bounded by a spatial axis parallel to gravity, i.e., a vertical spatial axis, and an axis inclined thereto.

To ensure a reliable and robust authentication with a low error rate, imaging-related deviations between the at least one recognition or combination image and the one or more reference images are compensated. This applies to embodiments according to the invention, in which the at least one recognition or combination image is compared with the one or more reference images; or a reference key is calculated in each case on the basis of the one or more reference images and a recognition key is calculated on the basis of the at least one recognition or combination image, and the recognition key is compared with the one or more reference keys.

An imaging-related deviation between the at least one recognition or combination image and the one or more reference images could lead to an authentic product not being recognized as such. In the specialist literature, such a test result is sometimes referred to as a "false-negative". Imaging-related deviations between the at least one recognition or combination image and the one or more reference images are caused, for example, by different camera perspectives when recording the one or more reference images and the at least one recognition image.

Two methods are proposed within the scope of the present invention for rectifying or compensating imaging-related deviations between the at least one recognition or combination image and the one or more reference images:

(i) recording a multiplicity of reference images of the reflecting or luminescent particles from different camera perspectives and storing these reference images and/or storing reference keys calculated from the respective reference image in a database; and (ii) performing an orientation mark-assisted or direct "registration" of the at least one recognition or combination image with the one or more reference images.

In the context of the present invention, method (i) is also referred to as a "perspective library method". The perspective library method is based on the concept of anticipating the probable camera perspectives when recording the at least one recognition image and of creating a reference library for a direct and quick comparison without computationally intensive image registration or with a simplified image registration.

In the present invention, the terms "register", "image registration," and "registration" denote digital methods in which an image transformation is ascertained on the basis of a reference image and a recognition or combination image in such a way that, when the image transformation is applied to the recognition or combination image, an image that is as similar as possible to the reference image is obtained. Image registration is required to calculate a measure of deviation between a recognition or combination image and one or more reference images. Without image registration, a comparison between a recognition or combination image and one or more reference images is error-afflicted and does not facilitate a reliable assignment and authentication.

Within the meaning of the present invention, the electronic or digital image registration represents only one of a plurality of possibilities for compensating imaging-related deviations between one or more recognition images or a combination image and one or more reference images. Alternative, likewise well-suited processes are based on artificial neural networks, in particular deep neural networks (DNN) or convolutional neural networks (CNN), which are available as free or commercial software (tensorflow.org; MATLAB® PatternNet). Hereinafter, methods are proposed, in which nearest neighbor algorithms (de.wikipedia.org/wiki/Nachste-Nachbarn-Klassifikation) are used.

In an advantageous embodiment of the method according to the invention, a serial number or a digital code, such as a bar code or QR code, imaged on the product, on a packaging film or on a label, is used during the authentication to assign one or more reference images to the recognition or combination image and avoid a computationally intensive search or a computationally intensive comparison with reference images of products that are not identical a priori. In the process, the serial number or the digital code acts as a quick sorting or search index.

Advantageous embodiments of the method according to the invention comprise processes for correcting imaging-related deviations between the at least one recognition or combination image and the one or more reference images of the reflecting and/or luminescent particles. In advantageous embodiments of the invention, imaging-related deviations between the recognition and reference image are compensated by means of digital image registration. Here, a method based on orientation marks or a direct method is applied for the image registration.

A method based on orientation marks comprises the steps of:
  recording a digital reference image with one or more orientation marks;
  recording a digital recognition image with the one or more orientation marks;
  calculating a digital image or correction transformation, which aligns or registers the orientation mark imaged in the recognition image with the orientation mark imaged in the reference image;
  applying the correction transformation to the recognition image in order to register the latter with the reference image.

The one or more orientation marks can be designed as geometric patterns, such as letters, numbers, lines, reticles or stripe patterns. Preferably, the one or more orientation marks are embodied as printing or a laser inscription on a label or packaging film.

In contrast to randomly distributed particles, orientation marks have a known shape, which simplifies the identification and assignment between a first and a second image, recorded from different camera perspectives, of an orientation mark in a reference and recognition image. In the specialist literature, orientation marks are sometimes referred to as "landmarks".

In direct image registration, an image or correction transformation is determined by means of iterative optimization methods in such a way that, when the correction transformation is applied to the recognition image, a corrected recognition image is obtained, the deviation of which from the reference image is minimal.

The prior art has disclosed various processes or algorithms for the digital registration of orientation marks and/or complete images (de.wikipedia.org/wiki/Bildregistrierung; elastix.isi.uu.nl).

The fundamentals of the known processes or algorithms for digital image registration are briefly explained below, use being made of the following symbols:
$I_R(i, j)$ ... reference image with pixels (i, j)
$I_E(i, j)$ ... recognition image with pixels (i, j)
T ... Image transformation
$M(T; I_R; I_E)$ metric (distance function)

The image transformation T maps each pixel (i, j) of the recognition image $I_E$ on a pixel $(i_T, j_T)$. Various maps can be considered for the image transformation T, such as:

$(i_T, j_T) = (i,j) + (t_1, t_2)$      (i) Translation $(i_T, j_T) = R[(i,j) - (c_1, c_2)] + (t_1, t_2) + (c_1, c_2)$      (ii) Euler transformation $(i_T, j_T) = s \cdot R[(i,j) - (c_1, c_2)] + (t_1, t_2) + (c_1, c_2)$      (iii) Similarity map $(i_T, j_T) = A[(i,j) - (c_1, c_2)] + (t_1, t_2) + (c_1, c_2)$      (iv) Affine map $(i_T, j_T) = (i,j) + \Sigma_{(i_s, j_s)} \Sigma_{m=0}^{3} a_m (i - i_s, j - j_s)^m$      (v) B spline mapping $(i_T, j_T) = (i,j) + A(i,j) + (t_1, t_2) + \Sigma_{(i_F, j_F)} c_F G(i - i_F, j - j_F)$      (vi) Spline kernel transformation where $(t_1, t_2)$ and $(c_1, c_2)$ denote two-dimensional displacement vectors, R denotes a two-dimensional rotation matrix, s denotes a scalar magnification or reduction factor, A denotes any two-dimensional matrix, $\Sigma_{(i_s, j_s)} \Sigma_{m=0}^{3} a_m (i - i_s, j - j_s)^m$ denotes cubic spline polynomials with nodes $(i_s, j_s)$ and coefficient $a_m$, and $\Sigma_{(i_F, j_F)} c_F G(i - i_F, j - j_F)$ denotes a sum of a base function G, weighted with coefficient $c_F$, at selected, so-called "landmark" positions $(i_F, j_F)$.

By way of example, a specific image transformation T comprises a rotation R through an angle 9 about a vertical axis or about the gravitational axis, a scaling factor s and a displacement or translation vector $(t_1, t_2)$, i.e., a total of four parameters. Such an image transformation T corresponds to a map of the following form:

$i_T = T_1(i,j) = s \cdot (\cos \varphi \cdot i - \sin \varphi \cdot j) + t_1$ $j_T = T_2(i,j) = s \cdot (\sin \varphi \cdot i + \cos \varphi \cdot j) + t_2$ The simple image transformation T above already represents a good approximation for deviations between the camera perspective when recording recognition images and the camera perspective when recording a reference image if the respective angles $\theta_E$ and $\theta_R$ between the optical axis of the camera and the gravitational axis are less than 10 degrees ($\theta_E \leq 10$ degrees and $\theta_R \leq 10$ degrees).

The metric M provides a measure of the deviation of the transformed recognition image $T(I_E)$ from the reference image $I_R$. Various measures can be used for the metric M, such as the mean squared difference (MSD), normalized correlation coefficient (NCC), mutual information (MI), normalized mutual information (NMI), and kappa statistics (KS).

The formulas for the calculation of MSD and NCC are shown below as examples:

$$MSD(T; I_R; I_E) = \frac{1}{M \cdot N} \sum_{i=1}^{N} \sum_{j=1}^{M} [I_R(i, j) - I_E(i_T, j_T)]^2$$

$$NCC(T; I_R; I_A) = \frac{\sum_{i=1}^{N} \sum_{j=1}^{M} [I_R(i, j) - \overline{I}_R][I_E(i_T, j_T) - \overline{I}_E]}{\sqrt{\sum_{i=1}^{N} \sum_{j=1}^{M} [I_R(i, j) - \overline{I}_R]^2 \sum_{i=1}^{N} \sum_{j=1}^{M} [I_E(i_T, j_T) - \overline{I}_E]^2}}$$

where $\overline{I}_R = \frac{1}{N \cdot M} \sum_{i=1}^{N} \sum_{j=1}^{M} I_R(i, j)$ and $\overline{I}_E = \frac{1}{N \cdot M} \sum_{i=1}^{N} \sum_{j=1}^{M} I_E(i, j)$ To reduce the computational outlay, a two-dimensional summation over selected image coordinates, for example over image coordinates with a grid-shaped equidistant distribution or over randomly selected image coordinates, can be used when calculating the metric M instead of using the full two-dimensional summation $\Sigma_{i=1}^{N} \Sigma_{j=1}^{M}$.

The initially unknown parameters of the image transformation T are determined by means of an iterative nonlinear optimization in such a way that the metric function M assumes a value that is less than a predetermined threshold. The iterative nonlinear optimization is based on quasi-Newton (QN), nonlinear conjugate gradient (NCG), gradient descent (GD) or Robbins-Monro (RM) methods or algorithms.

Preferably, strategies with incrementally increasing complexity of the image data (multiresolution) and/or of the image transformation T are applied when calculating the image transformation T. Thus, in a first stage, the resolution of the reference and deviation image is reduced by convolution with a Gaussian function (down sampling) and the resolution is increased up to the original resolution in subsequent steps using an increasingly refined (narrower) Gaussian function. Similarly, the complexity or the number of parameters of the image transformation to be fitted is incrementally increased. The aforementioned strategies accelerate the calculation and improve the numerical reliability or the probability of finding the global minimum of the metric function M during the nonlinear optimization.

A known problem with image registration, in particular direct image registration, consists in the fact that the correction transformation found is not optimal, i.e., only yields a local minimum instead of a global minimum in respect of the deviation between the corrected recognition image and the reference image. In order to avoid the problem of non-optimal image registration, an optional grid search for an approximation for the global minimum, which precedes the iterative optimization method, is proposed within the scope of the present invention.

Within the scope of the grid search, the multi-dimensional parameter space of the correction transformation is subdivided into equidistant nodes, the correction transformation associated with each node is calculated, and this is used to compare the corrected recognition image with the reference image. The node in the parameter space for which the deviation between the corrected recognition image and the reference image is minimal is used as an approximation for the global minimum. As an alternative to a grid search, a statistical search with nodes randomly distributed in the parameter space is also considered within the scope of the present invention.

A further object of the invention is that of providing a system for the optical authentication of products.

This object is achieved by a system comprising
(i) marks, each embodied as a film, film region, label or lacquer coating and containing randomly distributed, reflecting and/or luminescent particles;
(ii) a registration system comprising a primary image capture system for recording one or more reference images of a product equipped with a mark, and a primary image processing system;
(iii) a database;
(iv) a communication system on the basis of the Internet and/or a mobile wireless network; and
(v) one or more authentication systems, which each comprise a secondary image capture system for recording one or more recognition images of a product equipped with a mark, a secondary image processing system, and a digital pattern recognition system.

Expedient embodiments of the system according to the invention for optical product authentication are characterized in that
the density of the particles in the film, the film region, the label or the lacquer is 30 to 20 000 particles/cm$^3$;
the density of the particles in the film, the film region, the label or the lacquer is 30 to 10 000 particles/cm$^3$ or 30 to 5000 particles/cm$^3$;
the surface density of the particles in the film, the film region, the label or the lacquer is 1 to 100 particles/cm$^2$;
the surface density of the particles in the film, the film region, the label or the lacquer is 1 to 20 particles/cm$^2$, 10 to 30 particles/cm$^2$, 20 to 40 particles/cm$^2$, 30 to 50 particles/cm$^2$, 40 to 60 particles/cm$^2$, 50 to 70 particles/cm$^2$, 60 to 80 particles/cm$^2$, 70 to 90 particles/cm$^2$ or 80 to 100 particles/cm$^3$;
a product or a label is equipped with a transparent cover film containing reflecting and/or luminescent particles;
a product or a label has a multi-layer construction and one layer consists of a film containing reflecting and/or luminescent particles;
the particles consist of titanium dioxide and have a spherical form with an equivalent diameter in the range of 10 to 200 μm;
the particles consist of titanium dioxide and have a spherical form with an equivalent diameter in the range of 10 to 40 μm, 20 to 50 μm, 30 to 60 μm, 40 to 70 μm, 50 to 80 μm, 60 to 90 μm, 70 to 100 μm, 80 to 110 μm, 90 to 120 μm, 100 to 130 μm, 110 to 140 μm, 120 to 150 μm, 130 to 160 μm, 140 to 170 μm, 150 to 180 μm, 160 to 190 μm or 170 to 200 μm;
the particles consist of glass;
the particles consist of glass with an optical refractive index of 1.5 to 2.0;
the particles consist of glass with an optical refractive index of 1.5 to 1.7, 1.6 to 1.8, 1.7 to 1.9 or 1.8 to 2.0;
the particles consist of glass with an optical refractive index of 1.85 to 1.95;

the particles consist of glass and have a spherical form with an equivalent diameter in the range of 10 to 200 μm;

the particles consist of glass and have a spherical form with an equivalent diameter in the range of 10 to 40 μm, 20 to 50 μm, 30 to 60 μm, 40 to 70 μm, 50 to 80 μm, 60 to 90 μm, 70 to 100 μm, 80 to 110 μm, 90 to 120 μm, 100 to 130 μm, 110 to 140 μm, 120 to 150 μm, 130 to 160 μm, 140 to 170 μm, 150 to 180 μm, 160 to 190 μm or 170 to 200 μm;

each particle consists of a spherical substrate made of glass with an equivalent diameter in the range of 20 to 200 μm and spherical coating particles, arranged on the substrate, made of amorphous glass or a ceramic material such as titanium dioxide, for example, with an equivalent diameter of 0.5 to 10 μm;

the coating particles made of amorphous glass or a ceramic material such as titanium dioxide, for example, are frictionally connected to the surface of the spherical substrate made of glass;

the coating particles made of amorphous glass or a ceramic material such as titanium dioxide, for example, have an optical refractive index of 2.2 to 2.7;

the particles consist of an interference pigment;

the particles consist of interference pigment which comprises a substrate material such as mica, silicate, aluminum oxide, calcium aluminum borosilicate or aluminum, the substrate being equipped with an interference coating made of a material such as titanium dioxide, iron oxide, chromium oxide, zirconium oxide or silicon dioxide;

the particles consist of a fluorescent material to an extent of 20 to 100 wt %, said material fluorescing upon irradiation with light in the wavelength range from 430 to 490 nm, 30 to 100% of the intensity of the fluorescent light having a wavelength in the range of 650 to 800 nm;

the particles consist of a fluorescent material to an extent of 20 to 100 wt %, said material fluorescing upon irradiation with light in the wavelength range from 430 to 490 nm, 40 to 100%, 50 to 100%, 60 to 100%, 70 to 100% or 80 to 100% of the intensity of the fluorescent light having a wavelength in the range of 650 to 800 nm;

the particles consist of a fluorescent material which comprises europium-doped calcium aluminum silicon nitride ($CaAlSiN_3:Eu^{2+}$);

the particles consist of a fluorescent material which comprises europium-doped calcium aluminum silicon nitride ($CaAlSiN_3:Eu^{2+}$) and a glass, such as ZnO—$B_2O_3$—BaO—$Al_2O_3$ glass;

the particles consist of a luminescent material to an extent of 50 to 100 wt %, said material luminescing following irradiation with light in the wavelength range from 430 to 490 nm, 60 to 100% of the intensity of the luminescent light a wavelength in the range of 450 to 1000 nm;

the particles consist of a luminescent material to an extent of 50 to 100 wt %, said material luminescing following irradiation with light in the wavelength range from 430 to 490 nm and 60 to 100% of the intensity of the luminescent light has a wavelength in the range of 450 to 650 nm;

the particles consist of a luminescent material to an extent of 50 to 100 wt %, said material luminescing following irradiation with light in the wavelength range from 430 to 490 nm and 80 to 100% of the intensity of the luminescent light has a wavelength in the range of 450 to 650 nm;

the particles consist of a luminescent material to an extent of 50 to 100 wt %, said material luminescing following irradiation with light in the wavelength range from 430 to 490 nm and having a luminance of $\geq 400$ mcd/m$^2$, measured pursuant to DIN 67510-1:2009, after 1 min;

the particles consist of a luminescent material to an extent of 50 to 100 wt %, said material luminescing following irradiation with light in the wavelength range from 430 to 490 nm and having a luminance of $\geq 600$ mcd/m$^2$, $\geq 800$ mcd/m$^2$, $\geq 1000$ mcd/m$^2$, $\geq 1500$ mcd/m$^2$, $\geq 2000$ mcd/m$^2$, $\geq 4000$ mcd/m$^2$, $\geq 6000$ mcd/m$^2$, $\geq 8000$ mcd/m$^2$, $\geq 10\,000$ mcd/m$^2$, $\geq 20\,000$ mcd/m$^2$, $\geq 30\,000$ mcd/m$^2$ or $\geq 40\,000$ mcd/m$^2$, measured pursuant to DIN 67510-1:2009, after 1 min;

the particles consist of a material to an extent of 50 to 100 wt %, said material having a luminescence lifetime τ with 1 ms≤τ≤10 h;

the particles consist of a material to an extent of 50 to 100 wt %, said material having a luminescence lifetime τ with 10 ms≤τ≤10 h, 100 ms≤τ≤10 h, 1 s≤τ≤10 h, 10 s≤τ≤10 h or 60 s≤τ≤10 h;

the particles consist to an extent of 50 to 100 wt % of a material based on yttrium aluminum garnet ($Y_3Al_5O_{12}$; YAG), yttrium aluminum gallium garnet ($Y_3Al_{5-x}Ga_xO_{12}$ with 2.5≤x≤3.5; YAGG), strontium aluminate ($SrAl_2O_4$, $Sr_4Al_{14}O_{25}$), calcium aluminate ($CaAl_2O_4$), strontium thiogallate ($SrGa_2S_4$) or potassium titanium fluoride ($K_2TiF_6$);

the particles consist to an extent of 50 to 100 wt % of Ce- and/or Cr-doped yttrium aluminum garnet ($Y_3Al_5O_{12}$; YAG) or yttrium aluminum gallium garnet ($Y_3Al_{5-x}Ga_xO_{12}$ with 2.5≤x≤3.5; YAGG);

the particles consist to an extent of 50 to 100 wt % of Eu- and Dy-doped strontium aluminate ($SrAl_2O_4$, $Sr_4Al_{14}O_{25}$);

the particles consist to an extent of 50 to 100 wt % of Eu-, Nd- and/or Sr-doped calcium aluminate ($CaAl_2O_4$);

the particles consist to an extent of 50 to 100 wt % of Eu-doped strontium thiogallate ($SrGa_2S_4$);

the particles consist to an extent of 50 to 100 wt % of Mn-doped potassium titanium fluoride ($K_2TiF_6$);

the reflecting and/or luminescent particles comprise two, three, four, five or more different types, each particle consisting to an extent of 20 to 100 wt % of one of the above-described materials;

the reflecting and/or luminescent particles comprise two, three, four, five or more different types, each particle having one of the above-described structures;

the particles have an average size $d_{50}$ with 5 μm≤$d_{50}$≤200 μm;

the particles have an average size $d_{50}$ with 10 μm≤$d_{50}$≤150 μm, 20 μm≤$d_{50}$≤150 μm, 30 μm≤$d_{50}$≤150 μm, 40 μm≤$d_{50}$≤150 μm, 50 μm≤$d_{50}$≤150 μm or 30 μm≤$d_{50}$≤100 μm;

products or a packaging of products are each equipped with a serial number or a digital code, such as a barcode or QR code;

products or a packaging of products are each equipped with a label with a serial number or a digital code, such as a barcode or QR code;

products or a packaging of products are each equipped with one or more orientation marks;

products or a packaging of products are each equipped with a label comprising one or more orientation marks;

the registration system comprises a digital computer unit (microprocessor), electronic memory and software;

the registration system comprises a digital computer unit (microprocessor), electronic memory and software for controlling the primary image capture system;

the registration system comprises a digital computer unit (microprocessor), electronic memory and software for controlling the primary image processing system;

the registration system comprises a digital computer unit (microprocessor), electronic memory and software for data processing and data transmission;

the registration system is connected to the database;

the registration system is connected to the communication system;

the database is connected to the communication system;

the registration system is connected to the database via the communication system;

the primary image capture system comprises a camera with a CCD image sensor;

the primary image capture system comprises a camera with a CMOS image sensor;

the primary image capture system comprises a camera with a BSI image sensor;

the registration system is set up and configured to record two, three, four, five, six, seven, eight, nine, ten or more reference images of a product, equipped with a marker, from defined, differing camera perspectives;

the registration system is set up and configured to record 11 to 30, 20 to 40, 30 to 50, 40 to 60, 50 to 70, 60 to 80 or 70 to 100 reference images of a product, equipped with a marker, from defined, differing camera perspectives;

the registration system is set up and configured to record 101 to 300, 200 to 400, 300 to 500, 400 to 600, 500 to 700, 600 to 800 or 700 to 1000 reference images of a product, equipped with a marker, from defined, differing camera perspectives;

the registration system is set up and configured to record two, three, four, five, six, seven, eight, nine, ten or more reference images of the reflecting and/or luminescent particles from defined, differing camera perspectives;

the registration system is set up and configured to record 11 to 30, 20 to 40, 30 to 50, 40 to 60, 50 to 70, 60 to 80 or 70 to 100 reference images of the reflecting and/or luminescent particles from defined, differing camera perspectives;

the registration system is set up and configured to record 101 to 300, 200 to 400, 300 to 500, 400 to 600, 500 to 700, 600 to 800 or 700 to 1000 reference images of the reflecting and/or luminescent particles from defined, differing camera perspectives;

the registration system comprises an automatically driven rotary table for a product;

the registration system is set up and configured to record a plurality of reference images of the reflecting and/or luminescent particles from defined, differing camera perspectives, a product being arranged on a rotary table and the rotary table with the product being respectively rotated by a predetermined azimuthal difference angle between the recording of two successive reference images;

the registration system is set up and configured to record a plurality of reference images of the reflecting and/or luminescent particles from defined, differing camera perspectives and to tilt the camera by a predetermined polar difference angle in each case between the recording of two successive reference images;

the registration system is set up and configured to record a plurality of reference images of the reflecting and/or luminescent particles from defined, differing camera perspectives and to tilt the camera by a predetermined polar difference angle in each case between the recording of two successive reference images such that a polar tilt angle between the optical axis of the camera and the gravitational axis assumes a predetermined value;

the registration system comprises a 3D scanner;

the registration system is set up and configured to capture the shape of a product by means of a 3D scanner and to use the ascertained three-dimensional shape coordinates for a digital calibration of the one or more reference images;

the registration system is set up and configured to image one or more visual features of a product, such as contours, edges, inscriptions, barcodes, QR codes or label edges, in the at least one reference image, simultaneously with the reflecting and/or luminescent particles;

the registration system is set up and configured to image one or more orientation marks in the at least one reference image, simultaneously with the reflecting and/or luminescent particles;

the registration system is set up and configured to store the one or more reference image of the reflecting and/or luminescent particles in the database;

the registration system is set up and configured to calculate a reference key, in each case on the basis of the one or more reference images of the reflecting and/or luminescent particles;

the registration system is set up and configured to determine image coordinates of the reflecting and/or luminescent particles in each of the one or more reference images on the basis of the intensity of the reflected light or on the basis of the intensity of the luminescent light;

the registration system is set up and configured to determine image coordinates of the reflecting and/or luminescent particles in each of the one or more reference images by means of threshold separation;

the registration system is set up and configured to determine image coordinates of the reflecting and/or luminescent particles in each of the one or more reference images by means of grayscale value threshold separation;

the registration system is set up and configured to convert each of the one or more reference images into a grayscale value image file and to binarize the latter by means of grayscale value threshold separation;

the registration system is set up and configured to determine image coordinates of the reflecting and/or luminescent particles in each of the one or more reference images with the aid of a recursive grass fire algorithm;

the registration system is set up and configured to determine image coordinates of the reflecting and/or luminescent particles in each of the one or more reference images with the aid of a sequential grass fire algorithm;

the registration system is set up and configured to generate a reference key which comprises the image coordinates of the reflecting and/or luminescent particles in the respective reference image;

the registration system is set up and configured to generate a reference key which is composed of the image coordinates of the reflecting and/or luminescent particles in the respective reference image;

the registration system is set up and configured to generate a reference key which comprises angles of polygons formed from the image coordinates of the reflecting and/or luminescent particles in the respective reference image;

the registration system is set up and configured to generate a reference key which comprises angles of triangles formed from the image coordinates of the reflecting and/or luminescent particles in the respective reference image;

the registration system is set up and configured to store one or more reference keys in the database;

the registration system is set up and configured to store the serial number or the digital code in the database;

the registration system is set up and configured to link one or more reference keys and the serial number or the digital code in the database;

the registration system is set up and configured to link one or more reference keys and the serial number or the digital code in the database by means of a database relation;

the registration system is set up and configured to support a product on a horizontal surface when recording the one or more reference images;

the registration system is set up and configured to arrange a product on a horizontal surface when recording the one or more reference images;

the registration system is set up and configured to align the camera when recording the one or more reference images, in such a way that an angle between the optical axis of the camera and the gravitational axis is ≤5 degrees;

the registration system is set up and configured to align the camera when recording the one or more reference images, in such a way that an angle between the optical axis of the camera and the gravitational axis is ≤2 degrees;

the registration system is set up and configured to align the camera when recording the one or more reference images, in such a way that an angle between the optical axis of the camera and the gravitational axis is ≤1 degree;

the authentication system comprises a digital computer unit (microprocessor), electronic memory and software;

the authentication system comprises a digital computer unit (microprocessor), electronic memory and software for controlling the secondary image capture system;

the authentication system comprises a digital computer unit (microprocessor), electronic memory and software for controlling the secondary image processing system;

the authentication system comprises a digital computer unit (microprocessor), electronic memory and software for data processing and data transmission;

the authentication system comprises a digital computer unit (microprocessor), electronic memory and software for the digital pattern recognition system;

the digital pattern recognition system comprises a software-implemented neural network;

the digital pattern recognition system comprises a hardware- and software-implemented neural network;

the digital pattern recognition system comprises one or more graphics processors (GPUs);

the authentication system is connected to the communication system;

the authentication system is connected to the database;

the authentication system is connected to the database via the communication system;

the authentication system is set up and configured to digitally compensate imaging-related deviations between the at least one recognition image, or a combination image created from a plurality of recognition images, and the at least one reference image;

the authentication system is set up and configured to illuminate a product with light, 10 to 100% of the intensity thereof having a wavelength in the range of 430 to 490 nm;

the authentication system is set up and configured to illuminate a product with light, 10 to 90%, 20 to 80%, 30 to 70% or 40 to 60% of the intensity thereof having a wavelength in the range of 430 to 490 nm;

the authentication system is set up and configured to illuminate a product with the light of a GaN LED or an InGaN LED;

the authentication system is set up and configured to illuminate a product with the light of a white light GaN LED or a white light InGaN LED;

the authentication system comprises a stop for blocking ambient light;

the authentication system is set up and configured to block ambient light when recording the one or more recognition images;

the authentication system is set up and configured to block ambient light with the aid of a stop when recording the one or more recognition images;

the authentication system is set up and configured to block ambient light with the aid of a tubular stop when recording the one or more recognition images;

the authentication system comprises a camera equipped with a CCD sensor;

the authentication system comprises a camera equipped with a CMOS sensor;

the authentication system comprises a camera equipped with a BSI sensor;

the authentication system comprises a camera equipped with a color CCD sensor;

the authentication system comprises a camera equipped with a color CMOS sensor;

the authentication system comprises a camera equipped with a color BSI sensor;

the authentication system comprises a cellular telephone equipped with a digital camera;

the authentication system comprises a cellular telephone equipped with a digital camera and a GaN LED or InGaN LED;

the authentication system comprises a cellular telephone equipped with a digital camera and a white light GaN LED or white light InGaN LED;

the authentication system comprises a horizontal surface for supporting products;

the authentication system is set up and configured to align the camera when recording the one or more recognition images, in such a way that an angle between the optical axis of the camera and the gravitational axis is ≤5 degrees;

the authentication system is set up and configured to align the camera when recording the one or more recognition images, in such a way that an angle between the optical axis of the camera and the gravitational axis is ≤2 degrees;

the authentication system is set up and configured to align the camera when recording the one or more recognition images, in such a way that an angle between the optical axis of the camera and the gravitational axis is ≤1 degree;

the authentication system comprises a cellular telephone equipped with a tilt sensor;

the cellular telephone is set up and configured to measure an angle θ between the optical axis of the camera of the cellular telephone and the gravitational axis using the tilt sensor at the same time as the one or more recognition images are recorded;

the authentication system comprises a cellular telephone equipped with a 3-axis acceleration sensor;

the cellular telephone is set up and configured to measure an angle θ between the optical axis of the camera of the cellular telephone and the gravitational axis using the 3-axis acceleration sensor at the same time as the one or more recognition images are recorded;

the authentication system is set up and configured to record one, two, three, four, five, six, seven, eight, nine, ten or more recognition images;

the authentication system is set up and configured to record two, three, four, five, six, seven, eight, nine, ten or more recognition images from the same camera perspective;

the authentication system is set up and configured to record two, three, four, five, six, seven, eight, nine, ten or more recognition images from differing camera perspectives;

the authentication system is set up and configured to record two, three, four, five, six, seven, eight, nine, ten or more recognition images and irradiate a product with light in the time period between the recording of two recognition images;

the authentication system is set up and configured to record two, three, four, five, six, seven, eight, nine, ten or more recognition images and irradiate a product with light from a GaN LED, InGaN LED, white light GaN LED or white light InGaN LED in the time period between the recording of two recognition images;

the authentication system is set up and configured to digitally intensify the one or more recognition images;

the authentication system is set up and configured to intensify the one or more recognition images by means of digital image processing in order to increase the signal-to-noise ratio;

the authentication system is set up and configured to digitally overlay or add two, three, four, five, six, seven, eight, nine, ten or more recognition images;

the authentication system is set up and configured to digitally calculate a combination image on the basis of two, three, four, five, six, seven, eight, nine, ten or more recognition images;

the authentication system is set up and configured to image a serial number arranged on a product, a packaging film or a label simultaneously with the reflecting and/or luminescent particles;

the authentication system is set up and configured to digitize an image of a serial number using character recognition;

the authentication system is set up and configured to compare a serial number with serial numbers stored in a database;

the authentication system is set up and configured to image a digital code, such as a barcode or QR code, arranged on a product, a packaging film or a label simultaneously with the reflecting and/or luminescent particles;

the authentication system is set up and configured to decode a digital code;

the authentication system is set up and configured to compare a digital code with digital codes stored in a database;

the authentication system is set up and configured to image one or more visual features of a product, such as contours, edges, inscriptions, barcodes, QR codes or label edges, simultaneously with the reflecting and/or luminescent particles in the one or more reference images;

the authentication system is set up and configured to perform a digital image registration between the at least one recognition image and the one or more reference images on the basis of the one or more visual features of a product, such as contours, edges, inscriptions, barcodes, QR codes or label edges;

the authentication system is set up and configured to image one or more orientation marks simultaneously with the reflecting and/or luminescent particles in the one or more recognition images;

the authentication system is set up and configured to perform a digital image registration between the at least one recognition image and the one or more reference images on the basis of the one or more orientation marks;

the authentication system is set up and configured to digitally compare the at least one recognition image and the one or more reference images;

the authentication system is set up and configured to perform a digital image registration between the combination image and the one or more reference images on the basis of the one or more orientation marks;

the authentication system is set up and configured to digitally compare the combination image and the one or more reference images;

the authentication system is set up and configured to use an angle θ between the optical axis of the camera of the cellular telephone and the gravitational axis, measured by means of the tilt sensor, in the digital comparison of the at least one recognition image or the combination image with the one or more reference images;

the authentication system is set up and configured to use an angle θ between the optical axis of the camera of the cellular telephone and the gravitational axis, measured by means of the 3-axis acceleration sensor, in the digital comparison of the at least one recognition image or the combination image with the one or more reference images;

the authentication system is set up and configured to determine image coordinates of the reflecting and/or luminescent particles in each of the one or more recognition images on the basis of the intensity of the reflected light or on the basis of the intensity of the luminescent light;

the authentication system is set up and configured to determine image coordinates of the reflecting and/or luminescent particles in each of the one or more recognition images by means of threshold separation;

the authentication system is set up and configured to determine image coordinates of the reflecting and/or luminescent particles in each of the one or more recognition images by means of grayscale value threshold separation;

the authentication system is set up and configured to convert each of the one or more recognition images into a grayscale value image file and to binarize the latter by means of grayscale value threshold separation;

the authentication system is set up and configured to determine image coordinates of the reflecting and/or luminescent particles in each of the one or more recognition images with the aid of a recursive grass fire algorithm;

the authentication system is set up and configured to determine image coordinates of the reflecting and/or luminescent particles in each of the one or more recognition images with the aid of a sequential grass fire algorithm;

the authentication system is set up and configured to calculate a recognition key on the basis of the at least one recognition image;

the authentication system is set up and configured to calculate a recognition key on the basis of the combination image;

the authentication system is set up and configured to use an angle $\theta$ between the optical axis of the camera of the cellular telephone and the gravitational axis, measured by means of the tilt sensor, in the calculation of the recognition key;

the authentication system is set up and configured to use an angle $\theta$ between the optical axis of the camera of the cellular telephone and the gravitational axis, measured by means of the 3-axis acceleration sensor, in the calculation of the recognition key;

the recognition key comprises the image coordinates of the reflecting and/or luminescent particles in the respective recognition image;

the recognition key is compiled from the image coordinates of the reflecting and/or luminescent particles in the respective recognition image;

the recognition key comprises angles of polygons formed from the image coordinates of the reflecting and/or luminescent particles in the respective recognition image;

the recognition key comprises angles of triangles formed from the image coordinates of the reflecting and/or luminescent particles in the respective recognition image;

the recognition key comprises the image coordinates of the reflecting and/or luminescent particles in the combination image;

the recognition key is compiled from the image coordinates of the reflecting and/or luminescent particles in the combination image;

the recognition key comprises angles of polygons formed from the image coordinates of the reflecting and/or luminescent particles in the combination image;

the recognition key comprises angles of triangles formed from the image coordinates of the reflecting and/or luminescent particles in the combination image;

the authentication system is set up and configured to compare the recognition key with a reference key stored in the database;

the authentication system is set up and configured to compare the recognition key with a plurality of reference keys stored in the database;

the authentication system is set up and configured to display a positive authentication if the recognition key and a reference key stored in the database correspond to a sufficient extent; and/or the authentication system is set up and configured to display a negative authentication if the recognition key and a reference key stored in a database differ to a sufficient extent.

In the present invention, the terms "registration system" and "authentication system" denote functional units which comprise one or more hardware components, such as electronic computers and data memories, and one or more software programs and which may be spatially separated from one another and transmit and receive data between one another by means of a communication network. By way of example, the secondary image capture system and the secondary image processing system could be situated at different locations and be interconnected via the Internet and/or a mobile wireless network. In a particularly expedient embodiment of the invention, the secondary image capture system is embodied as a cellular telephone and the secondary image processing system is embodied as a powerful computer equipped with one or more graphics processors (GPUs), said computer being situated at the same location as the database and/or the registration system. Equally, it is advantageous if the digital pattern recognition system is arranged at the same location as the database.

Moreover, within the scope of the invention, configurations are envisaged in which the registration and authentication system partly use the same hardware components, in particular the same computer for the primary and secondary image processing system.

In another expedient embodiment, the secondary image capture system and the secondary image processing system are constituent parts of a cellular telephone.

The invention is explained in more detail below with the aid of a drawing.

FIG. 1 shows a schematic view of reflecting or luminescent particles 1, which are recorded by means of a camera (2, 2') from a first and second camera perspective. The optical axis of the camera (2, 2') from the first and second camera perspective is denoted by reference sign 3 and 3', respectively. FIG. 1 elucidates the circumstances that the digital image or the image coordinates of the reflecting and/or luminescent particles 1 vary depending on the respective camera perspective when recording a recognition or reference image. The differences between different camera perspectives or cameras (2, 2') are mathematically describable by rigid coordinate transformations, i.e., combinations of rotation and translation with 6 parameters (3 angles of rotation and 3 displacements). To keep the illustration clear, FIG. 1 and the description related thereto only consider rotations. Moreover, the mathematical description of translations is very simple.

Without loss of generality, a reference or world coordinate system and a camera coordinate system of the first camera perspective have corresponding axes x, y, z or (1, 0, 0), (0, 1, 0), (0, 0, 1). An origin of the camera coordinate system of the first camera perspective is displaced in relation to an origin of the world coordinate system along the z-axis by a certain distance, not denoted in FIG. 1. A camera coordinate system of the second camera perspective has axes x', y', z', which emerge from the axis x, y, z by a rotation by an azimuthal rotation angle $\varphi$, a polar rotation angle $\theta$, and an axial rotation angle $\omega$, which are mathematically representable as a non-commutative product of three rotation matrices $$R(z'\,|\,\omega-\varphi)\cdot R(z\,|\,\varphi)\cdot R(x\,|\,\theta)$$

with $$R(x\,|\,\theta) = \begin{pmatrix} 1 & 0 & 0 \\ 0 & \cos\theta & -\sin\theta \\ 0 & \sin\theta & \cos\theta \end{pmatrix}$$

$$R(z\,|\,\varphi) = \begin{pmatrix} \cos\varphi & -\sin\varphi & 0 \\ \sin\varphi & \cos\varphi & 0 \\ 0 & 0 & 1 \end{pmatrix}$$

$$z'\|\hat{z}' = \begin{pmatrix} \sin\varphi\cdot\sin\theta \\ -\cos\varphi\cdot\sin\theta \\ \cos\theta \end{pmatrix}$$

$$[R(z'\,|\,\omega-\varphi)]^{ij}\cdot[1-\cos(\omega-\varphi)]\cdot\hat{z}'_i\cdot\hat{z}'_j +$$

$$\cos(\omega-\varphi)\cdot\delta_{ij}+\sin(\omega-\varphi)\cdot\varepsilon_{ikj}\cdot\hat{z}'_k$$

where $\delta_{ij}$ is the Kronecker delta and $\varepsilon_{ikj}$ is the Levi-Civita symbol de.wikipedia.org/wiki/Drehmatrix; de.wikipedia.org/wiki/Kronecker-Delta; de.wikipedia.org/wiki/Levi-Civita-Symbol).

Furthermore, FIG. 1 shows a coordinate grid 4 with nodes, which each correspond to equidistant angle coordinates in the azimuthal and polar directions. The coordinate grid 4, shown in FIG. 1 in exemplary fashion, has 120=5×24 nodes with 24 different azimuthal angle values and 5 different polar angle values.

In addition to the coordinate grid 4 shown in FIG. 1, use is made according to the invention of an extended coordinate grid with nodes corresponding to equidistant values of the axial rotation angle $\omega$.

In a preferred embodiment of the method according to the invention, a plurality of reference images are recorded from different camera perspectives when registering a product marked with reflecting and/or luminescent particles, the different camera perspectives corresponding to a coordinate grid 4, shown in FIG. 1, with equidistant nodes or respectively equidistant values of the azimuthal, polar and axial rotation angle $\varphi$, $\theta$, $\omega$.

In relation to the particles, the term "size" denotes the equivalent diameter of a spherical particle with the same material composition, which, depending on the measuring method employed, has the same projection area (electron microscope) or the same light scattering as the examined particles.

According to the invention, the dimensions of the microscale particles or agglomerates are determined by means of a scanning electron microscope or transmission electron microscope and image analysis software, such as ImageJ (imagej.nih.gov/ij). Here, at least 100, preferably at least 1000 particles or agglomerates are digitally measured with the aid of the image analysis software on the basis of digitized electron microscopic recordings. On account of the high lateral resolution of electron microscopes in the prior art, which range between a few Angstroms and 10 nm, depending on the setting of the electron optics and the beam parameters, the equivalent diameter of the particles or agglomerates can be ascertained with high reliability.

Software-assisted methods for evaluating digital images of particles recorded by means of light or electron microscopes are known from the prior art and comprise the following steps:

algorithmically creating a grayscale value histogram;
interactively setting a suitable threshold in the grayscale value histogram in order to classify each image pixel as belonging to the background or to a particle or to a pore, depending on whether the grayscale value of the image pixel lies above or below the threshold;
algorithmically binarizing the image, i.e., converting the grayscale value image into a black/white image;
where necessary, performing algorithmic binary dilation and erosion (closing) to close gaps or binary erosion and dilation (opening) to eliminate artifacts such as pseudo-particles caused by image noise; and
algorithmically identifying contiguous areas of adjacent (black) image pixels, which are assigned particles or pores, and ascertaining the size or the number of image pixels contained in the respective area.

Software algorithms and programs of the type described above are usually part of the delivery content of modern light and electron microscopes or are available as an option. As an alternative thereto, generic image analysis programs such as ImageJ can be used.

In alternative or complementary fashion, the dimensions of microscale or nanoscale particles or agglomerates are measured by means of light scattering. A measuring device for particle sizes from 0.01 to 5000 µm, suitable to this end, is commercially available from Horiba Ltd. (Kyoto, Japan), inter alia, under the product name LA-300.

The invention claimed is:

1. A method for optical product authentication, comprising
a) marking a product by
packaging the product in a film; or
equipping the product or a packaging of the product with a label; or
equipping the product, a packaging of the product or a label arranged on the product or on the packaging with a lacquer coating; wherein
the film, the label or the lacquer coating contains randomly distributed, reflecting and/or luminescent particles;
b) registering a product marked as per a) above by
irradiating the product with light such that the particles reflect or luminesce; and
recording one or more digital reference images of the reflecting and/or luminescent particles using a camera; and
c) authenticating a product registered as per b) above by
irradiating the product with light to cause the particles to reflect or luminesce;
recording one or more recognition images of the reflecting and/or luminescent particles using a camera;
digitally comparing the at least one recognition image with the at least one reference image;
displaying a positive authentication if the at least one recognition image and the at least one reference image correspond; or
displaying a negative authentication if the at least one recognition image and the at least one reference image differ;
wherein
said method further comprises digitally compensating for imaging-related deviations between the at least one recognition image and the at least one reference image,
and the density of the particles in the film, the label or the lacquer is 30 to 20 000 particles/cm$^3$.

2. The method as claimed in claim 1, wherein the registration b) comprises recording two, three, four, five, six, seven, eight, nine, ten or more reference images of the reflecting and/or luminescent particles from defined, differing camera perspectives.

3. The method as claimed in claim 1, wherein the authentication c) comprises recording two, three, four, five, six, seven, eight, nine, ten or more recognition images from the same camera perspective as the registration b).

4. The method as claimed in claim 1, wherein the authentication c) comprises digitally intensifying the one or more recognition images.

5. The method as claimed in claim 1, wherein the authentication c) comprises carrying out a digital image registration between the at least one recognition image and the one or more reference images based on one or more visual features of the product or based on one or more orientation marks.

6. A method for optical product authentication, comprising
   a) marking a product by
      packaging the product in a film; or
      equipping the product or a packaging of the product with a label; or
      equipping the product, a packaging of the product or a label arranged on the product or on the packaging with a lacquer coating; wherein
      the film, the label or the lacquer coating contains randomly distributed, reflecting and/or luminescent particles;
   b) registering a product marked as per a) above by
      irradiating the product with light such that the particles reflect or luminesce; and
      recording one or more digital reference images of the reflecting and/or luminescent particles using a camera; and
   c) authenticating a product registered as per b) above by
      irradiating the product with light to cause the particles to reflect or luminesce;
      recording one or more recognition images of the reflecting and/or luminescent particles using a camera;
      digitally comparing the at least one recognition image with the at least one reference image;
      displaying a positive authentication if the at least one recognition image and the at least one reference image correspond; or
      displaying a negative authentication if the at least one recognition image and the at least one reference image differ;
      said method further comprises digitally compensating for imaging-related deviations between the at least one recognition image and the at least one reference image,
      wherein, the authentication c) further comprises imaging, digitizing or decoding either
      a serial number arranged on the product, packaging film or label or
      a digital code arranged on the product, packaging film or label,
      simultaneously with the recording of the reflecting and/or luminescent particles and comparing the imaged, digitized or decoded serial number or digital code with a serial number stored in a database or a digital code stored in a database.

7. A method for optical product authentication, comprising
   a) marking a product by
      packaging the product in a film; or
      equipping the product or a packaging of the product with a label; or
      equipping the product, a packaging of the product or a label arranged on the product or on the packaging with a lacquer coating; wherein
      the film, the label or the lacquer coating contains randomly distributed, reflecting and/or luminescent particles;
   b) registering a product marked as per a) above by
      irradiating the product with light such that the particles reflect or luminesce; and
      recording one or more digital reference images of the reflecting and/or luminescent particles using a camera; and
   c) authenticating a product registered as per b) above by
      irradiating the product with light to cause the particles to reflect or luminesce;
      recording one or more recognition images of the reflecting and/or luminescent particles using a camera;
      digitally comparing the at least one recognition image with the at least one reference image;
      displaying a positive authentication if the at least one recognition image and the at least one reference image correspond; or
      displaying a negative authentication if the at least one recognition image and the at least one reference image differ;
      said method further comprises digitally compensating for imaging-related deviations between the at least one recognition image and the at least one reference image,
   wherein the registration b) further comprises determining image coordinates of the reflecting and/or luminescent in each of the one or more reference images based on reflected light intensity or based on luminescent light intensity.

8. The method as claimed in claim 1, wherein the authentication c) further comprises determining image coordinates of the reflecting and/or luminescent particles in each of the one or more recognition images based on reflected light intensity or based on luminescent light intensity.

9. The method as claimed in claim 1, wherein the authentication c) further comprises measuring a tilt angle between the optical axis of the camera and a gravitational axis.

10. The method as claimed in claim 1, wherein the registration b) further comprises storing two, three, four, five, six, seven, eight, nine, ten or more reference images and/or two, three, four, five, six, seven, eight, nine, ten or more reference keys, calculated on the basis of one reference image in each case, in a database.

11. A system for the optical authentication of products, comprising
   (i) marks, each embodied within a film, film region, label or lacquer coating and containing randomly distributed, reflecting and/or luminescent particles;
   (ii) a registration system comprising a primary image capture system for recording one or more reference images of the product equipped with marks, and a primary image processing system;
   (iii) a database;
   (iv) a communication system based on internet and/or a mobile wireless network; and (v) one or more authentication systems, with each comprising a secondary image capture system for recording one or more recognition images of the product equipped with marks, a secondary image processing system, and a digital pattern recognition system, wherein the density of the particles in the film, the label or the lacquer is 30 to 20 000 particles/cm$^3$.

12. The system as claimed in claim 11, wherein the authentication system is set up and configured to digitally compensate imaging-related deviations between the at least one recognition image, or a combination image created from a plurality of recognition images, and the at least one reference image.

13. The system as claimed in claim 11, wherein the at least one authentication system comprises a cellular telephone.

14. The system as claimed in claim 11, wherein the registration system is set up and configured to record two, three, four, five, six, seven, eight, nine, ten or more reference images of the product, equipped with marks, from defined, differing camera perspectives.

15. The method as claimed in claim 6, wherein the digital code is a barcode or QR code.

* * * * *